United States Patent
Ogawa et al.

(10) Patent No.: US 10,243,490 B2
(45) Date of Patent: Mar. 26, 2019

(54) CONTROLLING MULTIPLE FACETS OF DUTY CYCLE RESPONSE USING A SINGLE MOTOR INTEGRATED CIRCUIT PIN

(71) Applicant: SEMICONDUCTOR COMPONENTS INDUSTRIES, LLC, Phoenix, AZ (US)

(72) Inventors: Takashi Ogawa, Ogaki (JP); Fumio Kumazawa, Ota (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 15 days.

(21) Appl. No.: 15/186,078

(22) Filed: Jun. 17, 2016

(65) Prior Publication Data

US 2017/0366116 A1 Dec. 21, 2017

(51) Int. Cl.
*H02P 6/14* (2016.01)
*H02P 27/08* (2006.01)
*H02P 6/24* (2006.01)

(52) U.S. Cl.
CPC .............. *H02P 6/14* (2013.01); *H02P 6/24* (2013.01); *H02P 27/08* (2013.01)

(58) Field of Classification Search
CPC . G05B 11/28; G05B 2219/42237; H02P 7/29; H02P 6/085; H02P 27/08; H02P 23/0077; G05D 3/18; H02M 7/53873; H02M 7/53875
USPC ........ 318/599, 811; 388/937, 800, 805, 811, 388/819
See application file for complete search history.

(56) References Cited

U.S. PATENT DOCUMENTS

| | | | | |
|---|---|---|---|---|
| 5,886,419 A * | 3/1999 | Saito | ................ | B60R 16/0315 307/10.1 |
| 7,038,438 B2 * | 5/2006 | Dwarakanath | ........ | H02M 3/157 323/283 |
| 7,489,855 B2 * | 2/2009 | Kraus | ................ | H02P 7/29 388/811 |
| 7,747,146 B2 * | 6/2010 | Milano | ................ | H02P 6/16 318/400.09 |
| 8,228,098 B2 * | 7/2012 | Zhao | ................ | H03K 7/08 327/114 |
| 8,278,860 B2 * | 10/2012 | Brown | ................ | H02P 6/182 318/400.01 |
| 8,796,976 B2 * | 8/2014 | Kusakawa | ................ | B25B 21/00 318/280 |

(Continued)

FOREIGN PATENT DOCUMENTS

| | | |
|---|---|---|
| JP | 62-205416 | 9/1987 |
| JP | 10-177403 | 6/1998 |

(Continued)

*Primary Examiner* — Rina I Duda
(74) *Attorney, Agent, or Firm* — IPTechLaw

(57) ABSTRACT

A system, in some embodiments, comprises: a motor; and control logic, coupled to the motor, to determine a duty keep status and a duty cycle threshold based on a received voltage, wherein the duty keep status indicates whether the system is to operate in a duty keep mode or a stop mode, wherein the duty cycle threshold indicates a minimum duty cycle for the motor if the system operates in said duty keep mode and indicates an input duty cycle threshold below which the control logic shuts off the motor if the system operates in the stop mode.

20 Claims, 6 Drawing Sheets

(56) References Cited

U.S. PATENT DOCUMENTS

| | | | |
|---|---|---|---|
| 8,988,015 B2* | 3/2015 | Forster | B25F 5/021 |
| | | | 318/3 |
| 2004/0078101 A1 | 4/2004 | Kondoh et al. | |
| 2006/0179047 A1 | 8/2006 | Bresemann et al. | |
| 2007/0248336 A1* | 10/2007 | Knab | H02P 7/282 |
| | | | 388/804 |
| 2008/0008459 A1* | 1/2008 | Haesters | G01R 19/0092 |
| | | | 388/811 |
| 2010/0141207 A1* | 6/2010 | Phillips | B25F 5/00 |
| | | | 320/114 |
| 2012/0161680 A1 | 6/2012 | Kitagawa | |
| 2014/0139153 A1 | 5/2014 | Aoki | |
| 2015/0064023 A1 | 3/2015 | Sasaki et al. | |
| 2015/0130384 A1 | 5/2015 | Mahdavi et al. | |
| 2015/0180388 A1 | 6/2015 | Ogawa | |
| 2015/0180390 A1 | 6/2015 | Ogawa | |

FOREIGN PATENT DOCUMENTS

| | | |
|---|---|---|
| JP | 11-015364 | 1/1999 |
| JP | 2000-091923 | 3/2000 |
| JP | 2004-310846 | 11/2004 |
| JP | 2008-131805 | 6/2008 |
| JP | 2011-196723 | 10/2011 |
| JP | 2012-119767 | 6/2012 |
| JP | 2013-132200 | 7/2013 |

\* cited by examiner

CONTROLLING MULTIPLE FACETS OF DUTY CYCLE RESPONSE USING A SINGLE MOTOR INTEGRATED CIRCUIT PIN

BACKGROUND

Motors of various types are often controlled using integrated circuits (ICs). A motor IC receives various input signals and uses those input signals to control different facets of the motor's operation, such as duty cycle, direction of motor rotation and thresholds at which motor rotation is enabled or shut off. The input signals that the IC uses to control the motor must be provided to the IC using separate input pins. Each such input pin occupies space and adds undesirable complexity and expense. Thus, reducing the number of input pins used is desirable.

SUMMARY

At least some of the embodiments disclosed herein are directed to a system, comprising: a motor; and control logic, coupled to the motor, to determine a duty keep status and a duty cycle threshold based on a received voltage, wherein the duty keep status indicates whether the system is to operate in a duty keep mode or a stop mode, wherein the duty cycle threshold indicates a minimum duty cycle for the motor if the system operates in said duty keep mode and indicates an input duty cycle threshold below which the control logic shuts off the motor if the system operates in the stop mode. One or more such embodiments may be supplemented using one or more of the following concepts, in any order and in any combination: wherein said control logic is part of an integrated circuit that receives said received voltage via a single input pin; further comprising a voltage divider circuit, coupled to the control logic, to provide said received voltage; further comprising an analog-to-digital converter (ADC) to convert said received voltage to a digital representation of the received voltage; wherein the control logic determines at least one of said duty keep status and said duty cycle threshold based on a keep status-duty cycle threshold curve, said curve plotted on a graph having one axis corresponding to multiple possible received voltages and another axis corresponding to multiple possible duty cycle threshold values; wherein said curve comprises first and second portions, said first portion corresponding to the duty keep mode and the second portion corresponding to the stop mode; wherein, to determine the duty keep status using said curve, the control logic determines whether the received voltage corresponds to said first portion or to said second portion; wherein, to determine the duty cycle threshold using said curve, the control logic determines a duty cycle threshold value of a point on the curve corresponding to said received voltage; wherein one half of the curve corresponds to the first portion and the other half of the curve corresponds to the second portion; wherein the first portion of said curve traverses a range of duty cycle threshold values, and wherein the second portion of the curve traverses the same range of duty cycle threshold values; wherein a contiguous segment of said curve has a constant duty cycle threshold value on either side of a border between the first and second portions; wherein the first portion of the curve has a positive slope and the second portion of the curve has a negative slope; wherein both the first and second portions of the curve have positive slopes; wherein the first portion of the curve has a negative slope and the second portion of the curve has a positive slope; wherein both the first and second portions of the curve have negative slopes.

At least some embodiments are directed to a computer-readable medium comprising code which, when executed, causes a processor to: receive a voltage via a single pin of an integrated circuit; use a keep status-duty cycle threshold curve to determine, based on said received voltage, whether to implement a duty keep mode or a stop mode for a motor; and use the curve to determine, based on said received voltage, a minimum duty cycle for the motor if said duty keep mode is implemented and to determine an input duty cycle threshold below which the motor is shut off if the stop mode is implemented. One or more such embodiments may be supplemented using one or more of the following concepts, in any order and in any combination: wherein said curve is plotted on a graph having one axis corresponding to multiple possible received voltages and another axis corresponding to multiple possible duty cycle threshold values, and wherein said curve comprises first and second portions, said first portion corresponding to the duty keep mode and the second portion corresponding to the stop mode, and wherein the slope for the first portion of the curve is positive and the slope for the second portion of the curve is negative.

At least some embodiments are directed to a method, comprising: receiving a voltage via a single pin of an integrated circuit; using the received voltage to determine whether to implement a duty keep mode or a stop mode for a motor; implementing either the duty keep mode or the stop mode for said motor based on said determination; if said duty keep mode is implemented, using the received voltage to identify and implement a minimum duty cycle for said motor; and if said stop mode is implemented, using the received voltage to identify and implement an input duty cycle threshold below which said motor is shut off. One or more such embodiments may be supplemented using one or more of the following concepts, in any order and in any combination: further comprising using a keep status-duty cycle threshold curve to determine whether to use the duty keep mode or stop mode, and further comprising using said curve to identify said minimum duty cycle or said input duty cycle threshold, and wherein said curve has a first portion corresponding to the duty keep mode and a second portion corresponding to the stop mode; further comprising maintaining a motor duty cycle no less than said minimum duty cycle if said duty keep mode is implemented, and further comprising shutting off said motor if a duty cycle of an input signal is below said input duty cycle threshold.

Figure 1:
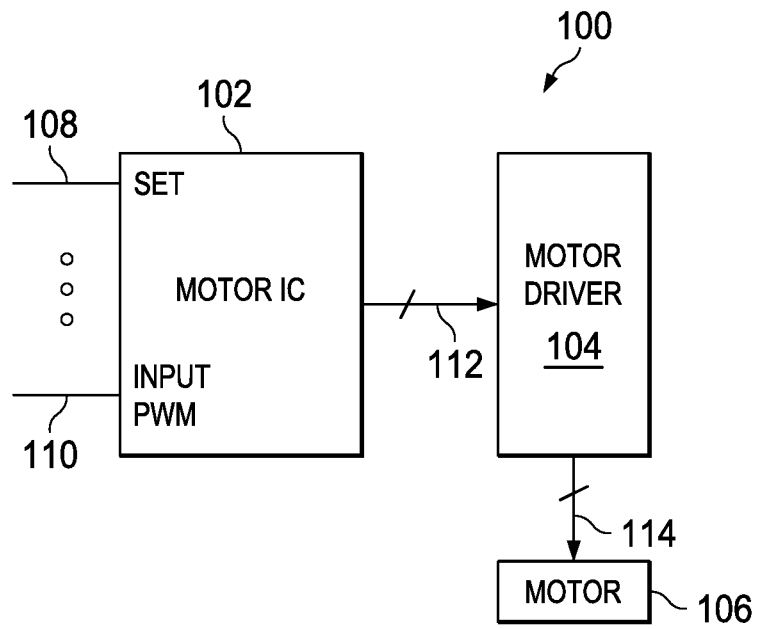
FIG. 1 is a block diagram of a motor system.

The specific embodiments given in the drawings and detailed description do not limit the disclosure. On the contrary, they provide the foundation for one of ordinary skill to discern the alternative forms, equivalents and modifications that are encompassed together with one or more of the given embodiments in the scope of the appended claims.

The term "couple" and variants thereof, as used herein, indicate a direct or indirect connection.

DETAILED DESCRIPTION

Disclosed herein are techniques for using a single motor integrated circuit (IC) input pin to manage the IC's duty cycle response. Specifically, control logic within the IC samples the voltage on the input pin and uses the sampled voltage to determine two parameters. One of these parameters is known as the "keep status" of the system, and it indicates whether the system is to operate in a "keep mode" or a "stop mode." The other parameter is a duty cycle threshold, the use of which varies depending on the keep status of the system. When the system is in the stop mode, the control logic shuts off the motor if the pulse wave modulated (PWM) input signal to the control logic drops below the duty cycle threshold. Thus, when the stop mode is in effect, the duty cycle threshold serves as an input duty cycle threshold. Conversely, when the system is in the keep mode, the control logic treats the duty cycle threshold as a minimum duty cycle and ensures that the motor's duty cycle does not drop below this threshold, regardless of the duty cycle of the PWM input signal provided to the control logic. The control logic determines the keep status and duty cycle threshold using a keep status-duty cycle threshold curve, which are described in greater detail below. In this way, a single voltage received on a single motor IC input pin may be used to control multiple facets of the IC duty cycle response.

FIG. 1 is a block diagram of a motor system 100 that comprises a motor IC 102, a motor driver 104 and a motor 106. The motor 106 may be any suitable type of motor, such as a brushless direct current (DC) motor, and it may be housed within any suitable electronic device, such as a fan. The motor driver 104 drives the motor 106 via connection 114, and, in turn, it is controlled by the motor IC 102 via connection 112. The motor IC 102, described in greater detail below, includes a variety of hardware, software and/or firmware that is implemented as needed to enable control of the motor driver 104. In particular, the motor IC 102 contains the components necessary to facilitate control of its duty cycle response based on a voltage received at a single input pin—that is, the SET pin that receives input signals via connection 108. The motor IC 102 additionally receives a preliminary PWM input signal on its INPUT PWM pin via connection 110. Other input pins are contemplated and fall within the scope of this disclosure.

Figure 2:
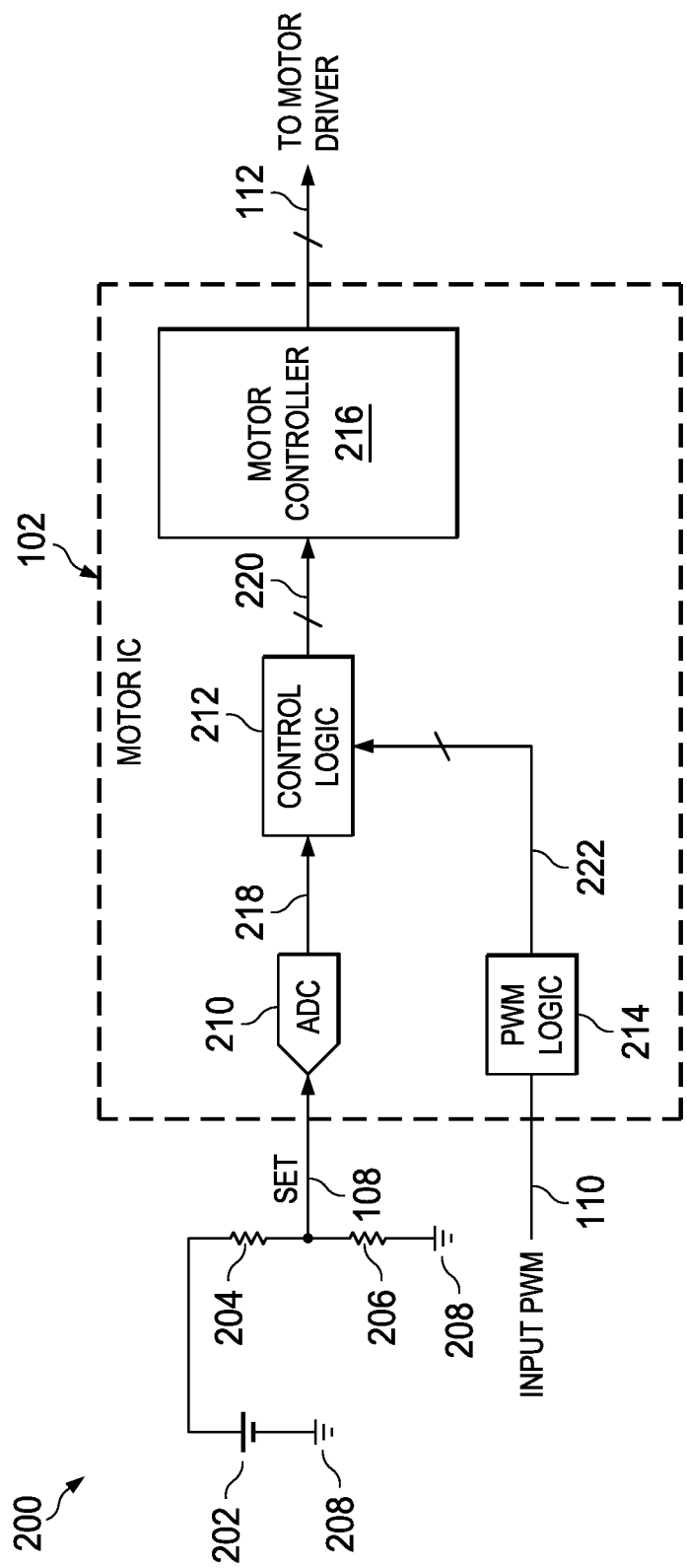
FIG. 2 is a block diagram of a motor integrated circuit (IC) and a schematic diagram of a voltage divider circuit.

FIG. 2 is a block diagram of the motor IC 102 and a schematic diagram of a voltage divider circuit 200. The motor IC 102 includes an analog-to-digital converter (ADC) 210 coupled to control logic 212 by way of a connection 218. In turn, control logic 212 couples to a motor controller 216 via a connection 220. Control logic 212 also couples to PWM logic 214 via a connection 222. The PWM logic 214 receives as its input the preliminary PWM input signal present at the INPUT PWM pin via connection 110 and processes the preliminary signal to provide a PWM input signal to the control logic 212 via connection 222. The ADC 210 receives as its input the signal present at the SET pin via connection 108. In at least some embodiments, the signal (i.e., analog voltage) present at connection 108 is provided by a voltage divider circuit 200. The voltage divider circuit 200 comprises a voltage source 202 (e.g., 5 volts), a resistor 204 (e.g., 10 kilo Ohms), a resistor 206 (e.g., 10 kilo Ohms), and ground connections 208. The motor controller 216, which comprises suitable processing, storage and/or code capabilities and examples of which are known, provides a motor driver output on connection 112. The motor driver output, which controls the motor driver 104 (FIG. 1), may contain any number of signals—for instance, a signal to set duty cycle and another signal to set motor rotation direction.

In operation, the voltage divider circuit 200 provides an analog voltage at connection 108—that is, at the SET pin of the motor IC 102. This analog voltage is determined based on the voltage at the voltage source 202 and the values of the resistors 204 and 206. One or more of these three components may be adjusted to dynamically modify the analog voltage present at the connection 108. The ADC 210 converts the analog voltage to a digital signal at connection 218. The digital signal at connection 218 is a digital representation of the analog voltage received via connection 108; accordingly, the analog voltage received at connection 108 and the digital representation thereof at connection 218 may be synonymously referenced herein.

Still describing the operation of the motor IC 102, the digital signal (i.e., the received voltage) is provided to control logic 212 via connection 218. Control logic 212 stores one or more keep status-duty cycle threshold curves, each of which describes the keep status (i.e., duty keep mode or stop mode) and duty cycle threshold (i.e., minimum motor duty cycle for duty keep mode; input duty cycle threshold for stop mode) that should be implemented for the motor system 100 based on the single received voltage that is digitally represented at connection 218. Stated another way, the control logic 212 uses a single voltage received at a single input pin (i.e., connection 218) to control multiple facets of the duty cycle response of the motor IC 102. The manner in which the control logic 212 accomplishes this using the keep status-duty cycle threshold curves is described in greater detail below. The term "single voltage" (or "a voltage" or "a received voltage"), as used herein, does not mean that additional voltages at the connection 108 cannot be sampled and used to control the duty cycle response of the motor IC. Rather, such terms are used to emphasize that multiple facets of the duty cycle response can be controlled based on a single voltage reading. The scope of disclosure includes subsequently sampling additional voltage readings and modifying the duty cycle response accordingly.

Based on the received voltage at connection 218, the control logic 212 determines the keep status and the duty cycle threshold as described below. In addition, the control logic 212 receives from the PWM logic 214 the PWM input signal via connection 222. The PWM input signal is a processed form of the preliminary PWM input signal received at the Input PWM pin. The precise type of processing performed by the PWM logic 214 is not directly relevant to the present discussion, and the PWM logic 214 may be designed as desired to produce a PWM input signal at connection 222 based on the preliminary PWM input signal at connection 110. The control logic 212 then uses the keep status, duty cycle threshold and PWM input signal to control the duty cycle of the motor IC 102. Specifically, if the control logic 212 determines that the IC 102 is to operate in stop mode, the logic 212 determines whether the duty cycle of the PWM input signal is below the duty cycle threshold. If so, the control logic 212 provides the motor controller 216 with a PWM output signal with a duty cycle of 0%, meaning that the motor is to be shut off. The logic 212 behaves in this manner because the duty cycle of the PWM input signal has fallen below the minimum acceptable duty cycle level. Otherwise, if the duty cycle of the PWM input signal is equal to or greater than the duty cycle threshold, the control logic 212 provides the motor controller 216 with a PWM output signal with a duty cycle that is equivalent to the duty cycle of the PWM input signal.

Conversely, if the control logic 212 determines that the IC 102 is to operate in duty keep mode, the logic 212 determines whether the duty cycle of the PWM input signal is below the duty cycle threshold. If so, the control logic 212 provides the motor controller 216 with a PWM output signal having a duty cycle that is set at the duty cycle threshold. In this way, the logic 212 ensures that even when the duty cycle of the PWM input signal drops to low levels, the motor continues rotating at a duty cycle that is at least equivalent to the duty cycle threshold. Thus, this duty cycle threshold is effectively a minimum duty cycle. Otherwise, if the duty cycle of the PWM input signal is equal to or greater than the duty cycle threshold, the control logic 212 provides the motor controller 216 with a PWM output signal with a duty cycle that is equivalent to the duty cycle of the PWM input signal.

Figure 3:
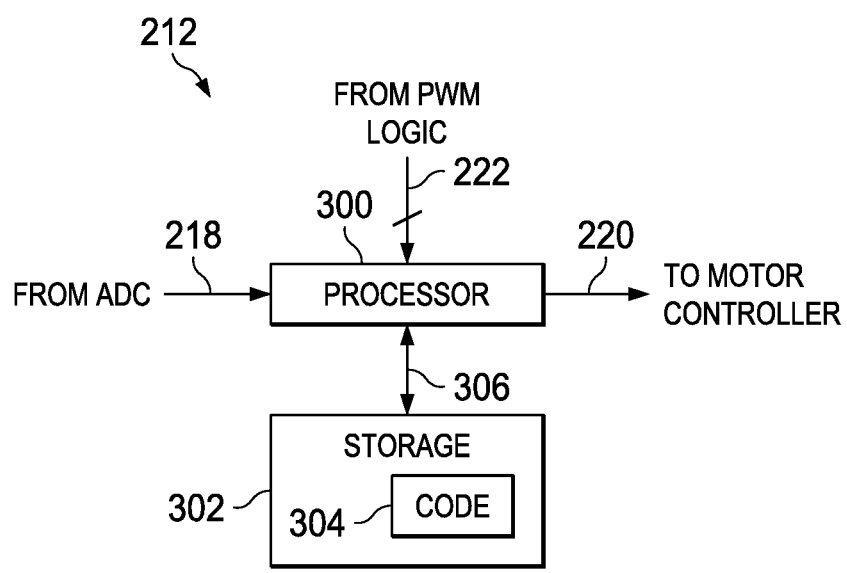
FIG. 3 is a block diagram of control logic in the motor IC.

FIG. 3 is a block diagram of control logic 212 in the motor IC 102. The control logic 212 in at least some embodiments comprises a processor 300 coupled to storage 302 (e.g., random access memory; read-only memory) via connection 306. The storage 302 stores code 304, which may be software, firmware, or a combination thereof. The processor 300 receives input signals from the ADC 210 via connection 218 and from the PWM logic 214 via connection 222. In turn, the processor 300 outputs signals to the motor controller 216 via connection 220. The code 304 is suitably programmed so that the processor 300, upon executing the code 304, performs the functions attributed herein to the control logic 212.

Although the control logic 212, PWM logic 214 and motor controller 216 are generally described herein and depicted in the figures as being independent, discrete components, the scope of disclosure is not limited as such. Instead, this disclosure encompasses embodiments in which these three components are consolidated into fewer components (e.g., sharing one or more processors and storage devices) or expanded into a greater number of components.

Figure 4:
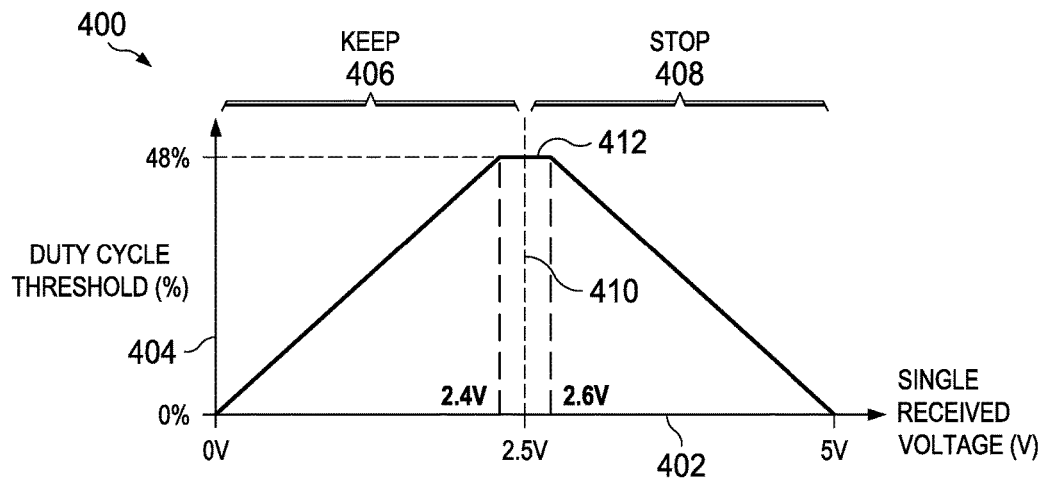
FIGS. 4-7 depict keep status-duty cycle threshold curves.

FIGS. 4-7 illustrate different curves to describe ways in which the control logic 212 uses a signal received on connection 218 to determine the motor system's duty keep status and duty cycle threshold. These keep status-duty cycle threshold curves are programmed into the control logic 212, although in some embodiments, the data constituting the curves may be stored in tabular format or any other suitable format. FIG. 4 depicts a keep status-duty cycle threshold curve 400. The graph on which curve 400 is plotted has an x-axis 402 corresponding to multiple possible received voltages and a y-axis 404 corresponding to multiple possible duty cycle threshold values. In FIG. 4, the x-axis values range from 0 volts to 5 volts, although this range may vary. The y-axis values range from 0% to 48%, but this range also may vary (e.g., from 0% to 50% as in FIGS. 5 and 7). The curve 400 is divided into two portions: a first portion 406 and a second portion 408. In at least some embodiments, the first and second portions are equal in length, and the border 410 between the two portions is at the mid-point of the voltage range on the x-axis (e.g., in the example shown, 2.5 volts). In some embodiments, the first portion 406 corresponds to a duty keep mode and the second portion 408 corresponds to a stop mode. (In alternative embodiments, the first portion 406 corresponds to a stop mode and the second portion 408 corresponds to the duty keep mode, but, for purposes of this disclosure, the former arrangement is assumed.) The slope of a majority of the first portion 406 is positive (e.g., +1) and the slope of a majority of the second portion 408 is negative (e.g., −1). The curve 400 has a flat segment 412 such that it has the same duty cycle threshold value on either side of the border 410. The significance of the flat segment 412 is that it prevents abrupt changes in system operation. Each of the first and second portions 406, 408 traverses the same range of duty cycle threshold values along the y-axis, as shown.

Referring to FIGS. 1, 2 and 4, in operation, the control logic 212 receives a voltage via connection 218 and locates this voltage on the x-axis. Locating the received voltage on the x-axis determines whether the motor system is in a keep mode or a stop mode. For instance, if the connection 218 carries a signal representing a voltage at connection 108 of 2.0 volts, the control logic 212 determines that this voltage corresponds to the first portion 406 of the curve 400. As a result, the control logic 212 concludes that the duty keep mode should be implemented. Further, the control logic 212 uses the received voltage and the first portion 406 of the curve 400 to determine a corresponding duty cycle threshold on the y-axis. In the case of a received voltage of 2.0 volts, the corresponding value on the y-axis is approximately 40%. When the keep mode is implemented, this duty cycle threshold (i.e., 40%) represents the minimum duty cycle at which the motor IC 102 will rotate the motor 106, regardless of the duty cycle of the PWM input signal. (When the stop mode is implemented, the duty cycle threshold represents the value of the PWM input signal duty cycle below which the motor IC 102 will shut off the motor 106.) Thus, the control logic 212 determines that a received voltage of 2.0 volts requires that the system implement the duty keep mode and that the minimum duty cycle of the PWM output signal be 40%. The control logic 212 generates the PWM output signal accordingly, and the PWM output signal is subsequently provided to the motor controller 216 to control the motor 106.

The flat segment 412 of the curve 400 mitigates abrupt changes in system operation that would otherwise be present if the flat segment were absent and it were replaced with a triangular peak. The flat segment 412 provides a constant duty cycle threshold in the region of the border 410 between the keep and stop modes—i.e., the area where relatively small fluctuations in received voltage can change the duty keep mode.

Figure 5:
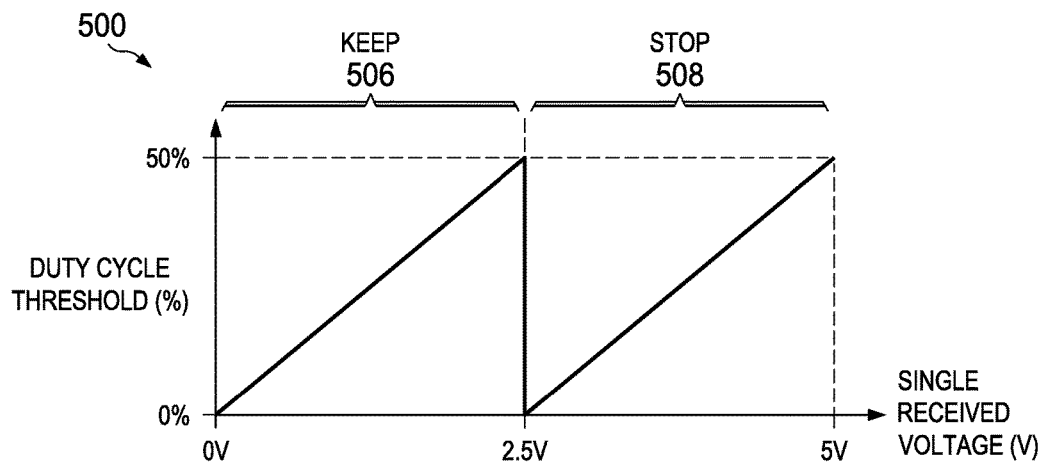
Figure 6:
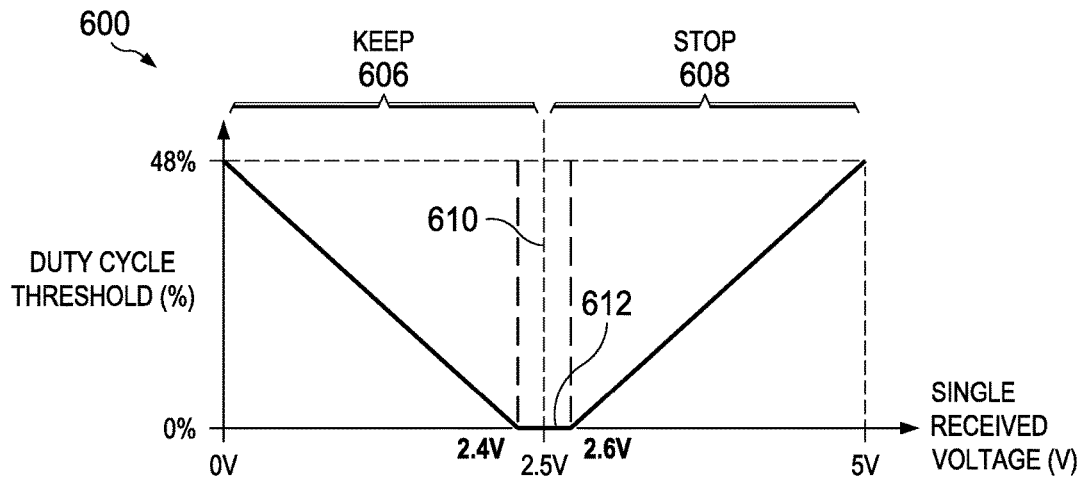
Figure 7:
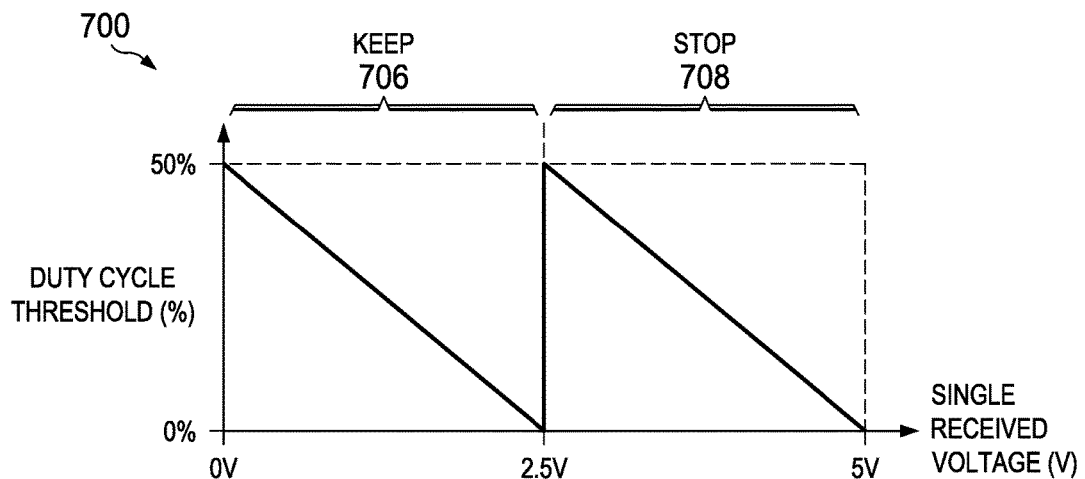

FIGS. 5-7 depict alternative curves, all of which are used by the motor IC 102 in generally the same way as the curve 400 of FIG. 4. Specifically, FIG. 5 depicts a curve 500 having a first portion 506 and a second portion 508. The slope of the first portion 506 is positive (e.g., +1) and the slope of the second portion 508 is also positive (e.g., +1). In some embodiments, the first and second portions are equal in length, although the scope of disclosure is not limited as such. FIG. 6 depicts a curve 600 having a first portion 606 and a second portion 608. The slope of a majority of the first portion 606 is negative (e.g., −1) and the slope of a majority of the second portion 608 is positive (e.g., +1). The curve 600 includes a flat segment 612 (i.e., similar to the flat segment 412 in FIG. 4) straddling the border 610, as shown. In some embodiments, the first and second portions are equal in length, although the scope of disclosure is not limited as such. FIG. 7 depicts a curve 700 having a first portion 706 and a second portion 708. The slope of the first portion 706 is negative (e.g., −1) and the slope of the second portion 708 also is negative (e.g., −1). In at least some embodiments, the first and second portions are equal in length, although the scope of this disclosure is not limited as such. Both the first and second portions of each curve in FIGS. 5-7 traverse the same range of duty cycle threshold values along the y-axis, as shown.

Figure 8:
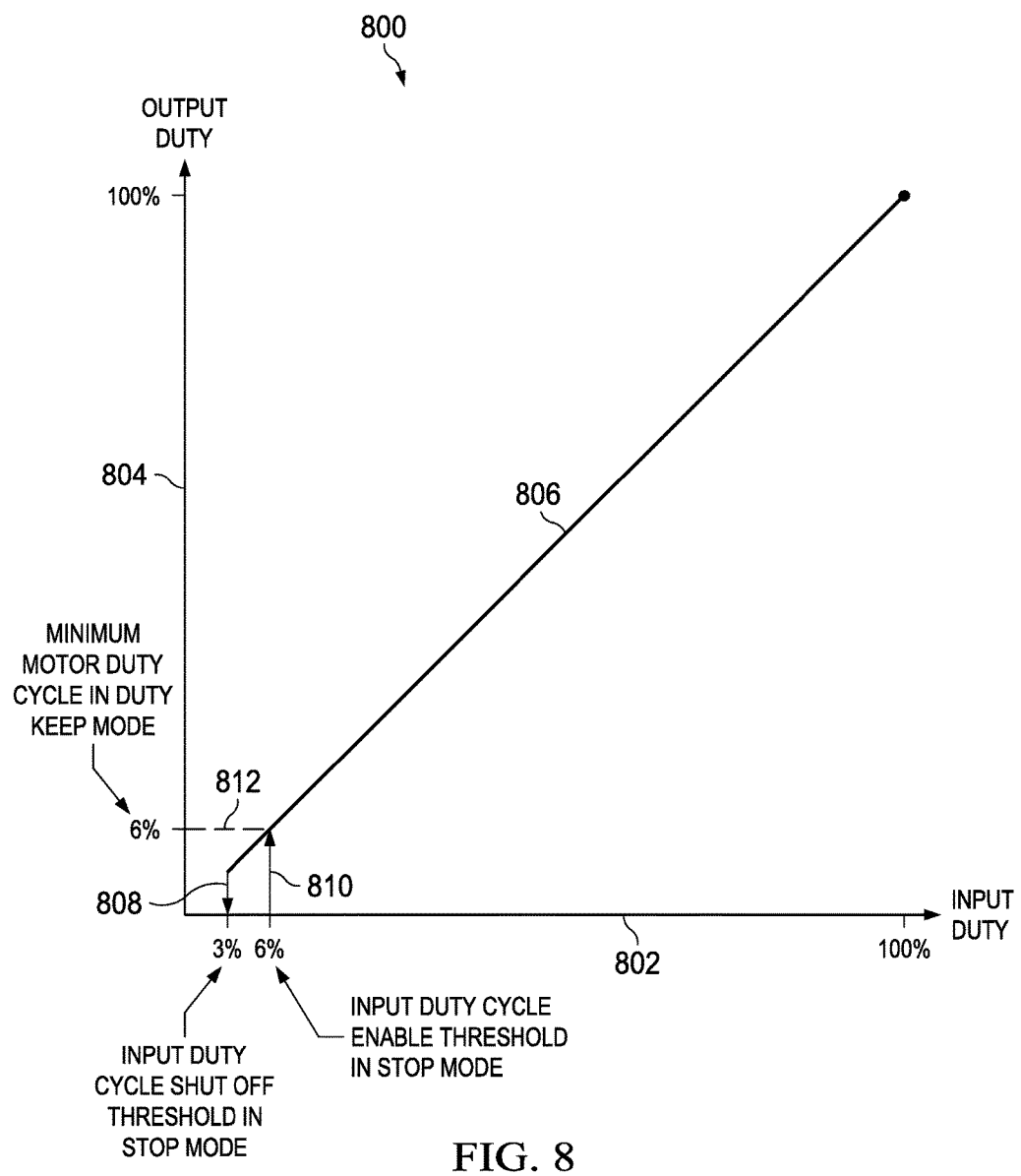
FIG. 8 is a duty cycle curve representing the motor IC duty cycle response.

FIG. 8 is a graph 800 of an illustrative duty cycle curve 806 representing the motor IC duty cycle response to various PWM input signal duty cycle values. The functionality resulting in the response depicted by curve 806 is implemented in the control logic 212. The x-axis 802 of the graph 800 represents input duty cycle—that is, the duty cycle of the PWM input signal at connection 222 (FIG. 2). The y-axis 804 of the graph 800 represents output duty cycle—that is, the duty cycle of the PWM output signal provided to the motor controller 216 via the connection 220 and ultimately provided to the motor driver 104 via connection 112. The majority of the curve 806 is generally linear and has a positive slope of 1. Thus, for example, an illustrative input duty cycle of 50% results in an output duty cycle of 50%.

The areas denoted by numerals 808, 810 and 812 denote thresholds pertaining to the motor IC duty cycle response. Specifically, numeral 808 refers to an input duty cycle threshold when the motor system is in the stop mode. If the duty cycle of the PWM input signal is below this threshold, the motor IC 102 shuts off the motor 106 (FIGS. 1 and 2). This threshold may be determined using one of the curves shown in FIGS. 4-7. For instance, referring to curve 400, a received voltage at pin 108 of approximately 4.85 volts results in an implementation of the stop mode (since 4.85 volts corresponds to second portion 408) with an input duty cycle threshold of approximately 3%. The control logic 212 ensures that if the PWM input signal has a duty cycle below 3%, the PWM output signal will have a duty cycle of 0%, and the motor will be shut off. Numeral 810 denotes an illustrative duty cycle of the PWM input signal at which the motor may resume rotating if the system is in stop mode. The control logic 212 may be programmed with these thresholds. The thresholds indicated by numerals 808 and 810 are merely illustrative. The scope of disclosure is not limited to any particular numeral thresholds.

Numeral 812 represents the minimum duty cycle of the motor when the system is in duty keep mode. Regardless of the duty cycle of the PWM input signal, the duty cycle of the motor will not drop below the minimum duty cycle when the system is in duty keep mode. For example, referring to curve 400, a received voltage at pin 108 of approximately 0.30 volts results in the implementation of the keep mode (since 0.30 volts corresponds to first portion 406) with a minimum duty cycle of 6%. The control logic 212 ensures that regardless of the duty cycle of the PWM input signal, the PWM output signal will maintain a minimum duty cycle of 6%. The threshold indicated by numeral 812 is merely illustrative. The scope of disclosure is not limited to any particular numeral threshold.

Figure 9:
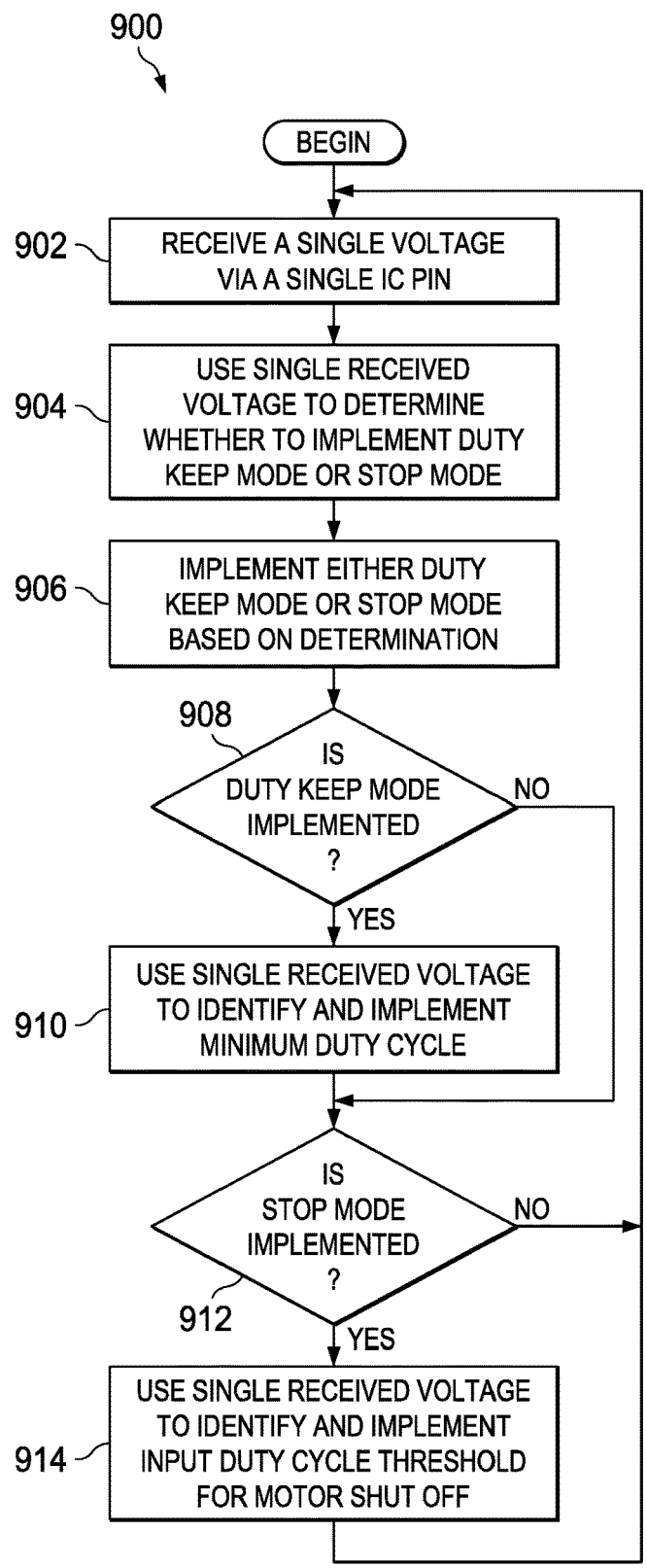
FIG. 9 is a flow diagram of a method to control multiple facets of the motor IC duty cycle response using a voltage on a single input pin.

FIG. 9 is a flow diagram of a method 900 to control the motor IC duty cycle response using a single IC input pin. The method 900 begins by receiving a single voltage via a single IC pin (step 902). As shown in FIG. 2 and as described above, this voltage is sampled from the connection 108 via the SET pin and a digital representation thereof is provided on the connection 218. The method 900 next includes using the single received voltage to determine whether to implement the duty keep mode or the stop mode (step 904). The motor IC 102 may make this determination using a keep status-duty cycle threshold curve (e.g., such as those shown in FIGS. 4-7), or it may make such a determination based on data that could be used to generate such curves. The method 900 subsequently comprises implementing either the duty keep mode or the stop mode based on the determination of step 904 (step 906). If the duty keep mode is implemented (step 908), the method 900 includes using the single received voltage to identify and implement a minimum duty cycle (step 910). As explained in detail above, the minimum duty cycle may be determined using the illustrative curves of FIGS. 4-7 or using data that may be used to generate such curves. If the stop mode is implemented (step 912), the method 900 comprises using the single received voltage to identify and implement an input duty cycle threshold for motor shut off (step 914). As explained above, this threshold may be determined using the illustrative curves of FIGS. 4-7 or using data that may be used to generate such curves. Control of the method 900 then returns to step 902.

Numerous other variations and modifications will become apparent to those skilled in the art once the above disclosure is fully appreciated. It is intended that the following claims be interpreted to embrace all such variations, modifications and equivalents.

What is claimed is:

1. A system for controlling a motor, the system comprising:
    a voltage divider circuit coupled to an input of a motor integrated circuit (IC);
    a motor driver coupled to an output of the motor IC, the motor IC comprising:
        a control logic configured to receive a voltage signal from the voltage divider circuit through an analog-to-digital converter (ADC);
        a pulse-width-modulation (PWM) logic coupled with the control logic, the control logic configured to receive a PWM input signal; and
        a motor controller coupled to an output of the control logic;
        wherein the control logic is configured to generate a keep status and a duty cycle threshold based upon the voltage signal; and
        wherein the keep status comprises one of a keep mode or a stop mode.

2. The system of claim 1, wherein the control logic is configured to send a stop signal if the control logic generates the stop mode and if the PWM input signal is less than the duty cycle threshold.

3. The system of claim 1, wherein the motor IC receives the voltage signal through a single input pin.

4. The system of claim 1, wherein the control logic comprises a set of voltage values and a corresponding set of duty cycle threshold values.

5. The system of claim 4, wherein a plurality of consecutive voltage values correspond to a single duty cycle threshold value.

6. The system of claim 4, wherein the set of voltage values and the set of duty cycle threshold values comprise a first portion corresponding to the keep mode and a second portion corresponding to the stop mode.

7. The system of claim 6, wherein the voltage signal corresponds with one of the first portion or the second portion.

8. A motor integrated circuit comprising:
    an analog-to-digital converter (ADC) configured to receive a voltage signal from a voltage divider circuit;
    a control logic coupled to the ADC, the control logic configured to receive a digital form of the voltage signal from the ADC; and
    a pulse-width-modulation (PWM) logic coupled to the control logic, the control logic configured to receive a PWM input signal from the PWM logic;
    wherein the control logic is configured to generate a keep status and a duty cycle threshold based upon the voltage signal, the keep status comprising one of a stop mode or a keep mode; and wherein the control logic is configured to send a stop signal to a motor controller if the control logic generates the stop mode and if the PWM input signal is less than the duty cycle threshold.

9. The circuit of claim 8, wherein the control logic is configured to output a signal to maintain motor rotation if the control logic generates the keep mode.

10. The circuit of claim 8, wherein the control logic comprises a processor configured to receive the PWM input signal and the voltage signal.

11. The circuit of claim 8, wherein the circuit comprises the motor controller coupled to the control logic.

12. The circuit of claim 8, wherein the control logic comprises a set of voltage values and a set of duty cycle threshold values.

13. The system of claim 12, wherein a plurality of consecutive voltage values correspond to a single duty cycle threshold value.

14. The system of claim 12, wherein the set of voltage values and the set of duty cycle threshold values comprise a first portion corresponding to the keep mode and a second portion corresponding to the stop mode.

15. The system of claim 14, wherein the voltage signal corresponds with one of the first portion or the second portion.

16. A method of controlling a motor, the method comprising:

receiving, at a control logic, a voltage signal, the control logic comprising a set of voltage values and a set of duty cycle values;

calculating, using the control logic, a keep status and a duty cycle threshold based on the voltage signal, the set of voltage values, and the set of duty cycle values, wherein the keep status comprises one of a keep mode or a stop mode;

receiving, at the control logic, a pulse-width-modulation (PWM) input signal from a PWM logic;

determining, if the stop mode is calculated, using the control logic, whether the PWM input signal is less than the duty cycle threshold and sending, if the input signal is less than the duty cycle threshold, a stop signal to a motor controller coupled to the control logic; and sending, if the keep mode is calculated, an output signal to the motor controller indicating that a motor is to continue rotating.

17. The method of claim 16, further comprising converting the voltage signal using an analog-to-digital converter.

18. The method of claim 16, wherein calculating comprises comparing the voltage signal to the set of voltage values comprised in the control logic.

19. The method of claim 16, wherein the set of voltage values corresponds to a set of duty cycle thresholds.

20. The method of claim 16, wherein the keep status and the duty cycle threshold are calculated without using the PWM input signal.

* * * * *